3,398,813
INDIVIDUAL AND COMBINATION WHEEL
BRAKE MECHANISM
Andrew A. Pontani, 14728 Lassen,
Sepulveda, Calif. 91343
Filed Jan. 3, 1967, Ser. No. 606,873
5 Claims. (Cl. 188—16)

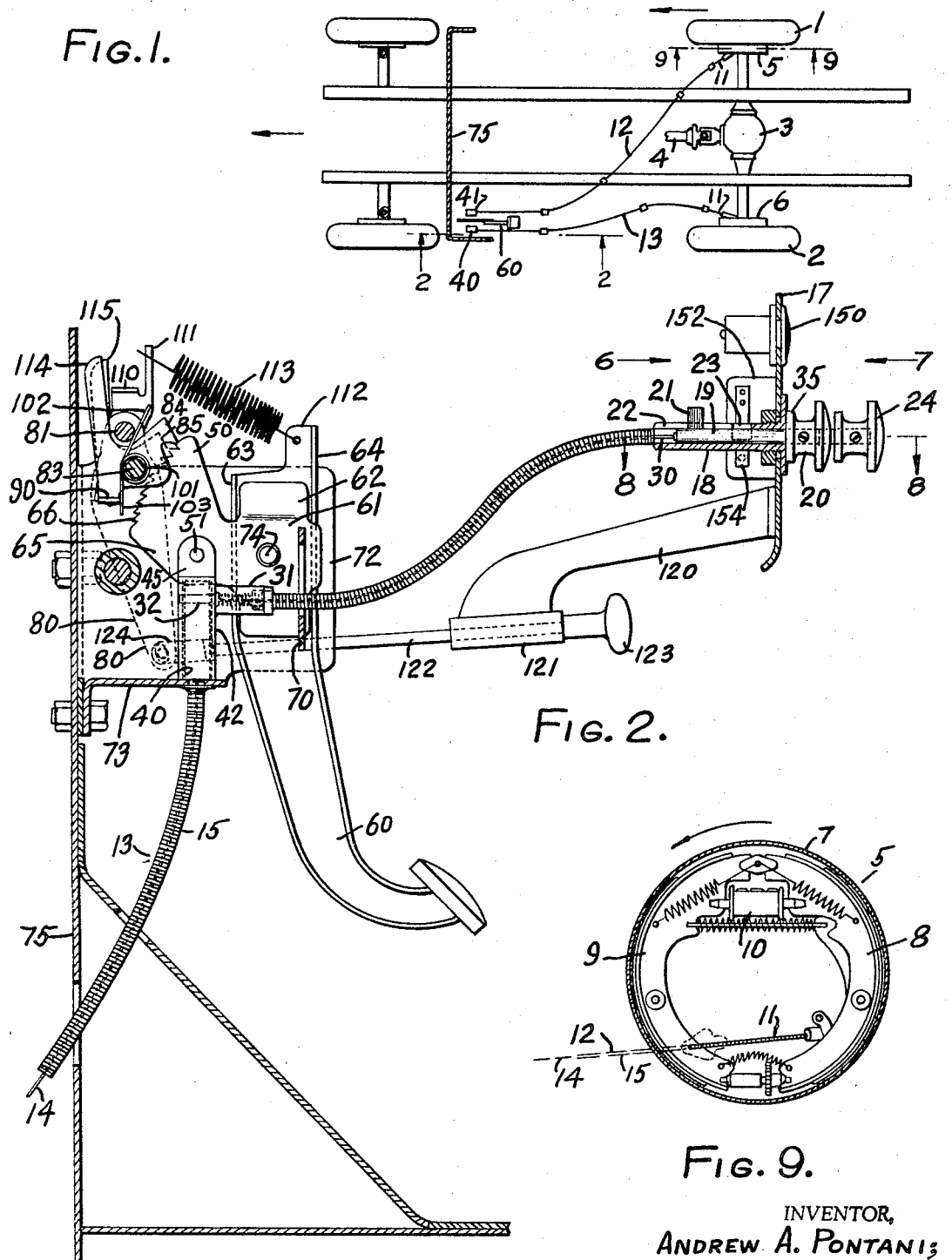

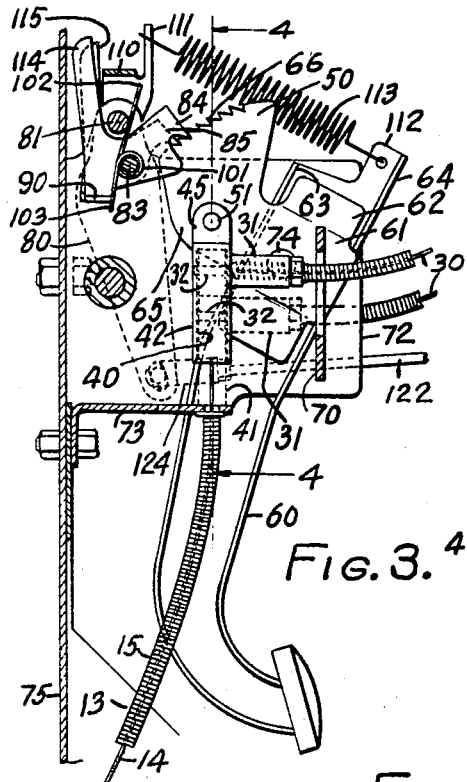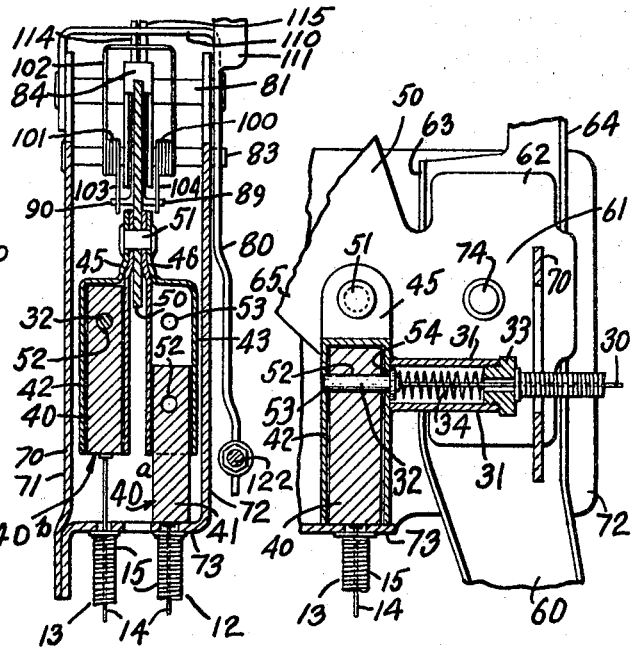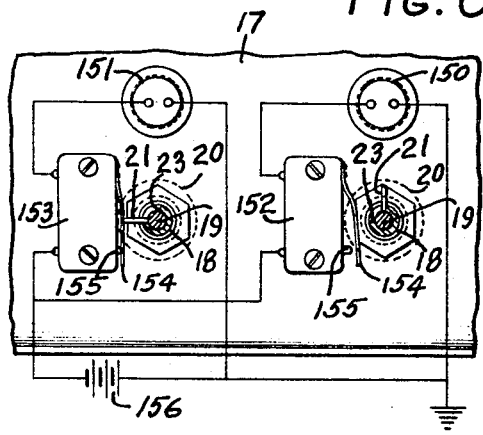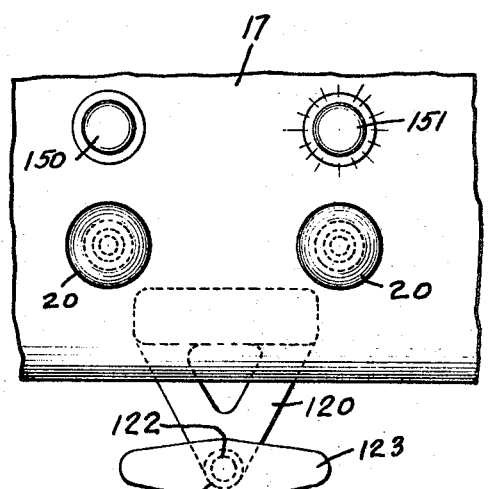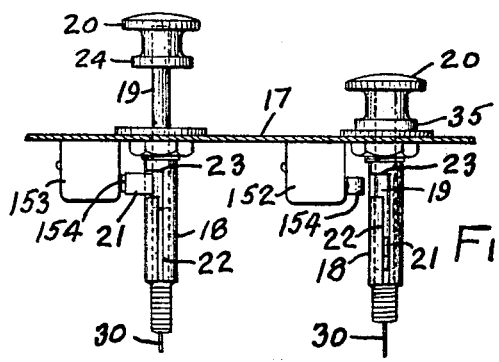
INVENTOR,
ANDREW A. PONTANI;
ATTORNEY United States Patent Office 3,398,813
Patented Aug. 27, 1968

ABSTRACT OF THE DISCLOSURE

This invention relates to an emergency brake lever mechanism for vehicles; the rear wheels of the vehicle may be braked simultaneously or a single wheel may be braked, the other wheel being allowed to rotate under engine power through a differential. The brake mechanism includes a pair of housings movable with the lever, a slide block in each housing connected by a cable with a rear brake and means for selectively locking and unlocking each block to its housing.

---

An object of the invention is to provide apparatus easily installed in a motor vehicle in conjunction with the emergency brake whereby the emergency brake under normal operation may brake both wheels of the vehicle, or brake an individual wheel the other wheel being free of braking action.

A further object is the provision of an individual and combination rear wheel emergency brake wheel mechanism which will selectively brake one rear wheel while permitting the other rear wheel to rotate under engine power together with means for indicating the rotating wheel.

A further object is the provision of individual and combination rear wheel emergency brake lever mechanism which will function efficiently, is easy to operate, foolproof, of simple construction, of few parts, and which mechanism when one wheel is braked, the other wheel being free of braking action, is easily released from such condition so that both brakes will operate simultaneously.

With the above and other objects in view, the invention consists in the novel and useful provision, formation, construction, association and relative arrangement of parts, members and features, all as shown in one embodiment in the accompanying drawings, described generally, and more particularly pointed out in the claims.

In the drawings:

FIGURE 1 is a skeleton view, partly in section, of a motor vehicle frame showing the emergency braking mechanism connected to the rear wheels of the vehicle;

FIGURE 2 is a fragmentary, enlarged sectional view, taken on the line 2—2 of FIGURE 1;

FIGURE 3 is a fragmentary, partially sectional view showing the emergency brake lever in a moved position from that of FIGURE 2;

FIGURE 4 is a fragmentary sectional view on the line 4—4 of FIGURE 3, and on an enlarged scale;

FIGURE 5 is a fragmentary, partially sectional view showing the mechanism in the same position as that shown in FIGURE 2;

FIGURE 6 is a fragmentary view looking in the direction of the arrow 6 of FIGURE 2;

FIGURE 7 is a fragmentary view looking in the direction of the arrow 7 shown in FIGURE 2;

FIGURE 8 is a sectional view on the line 8—8 of FIGURE 2; and,

FIGURE 9 is an elevational view, partly in section, of brake mechanism which may be used in conjunction with the present invention.

Referring now to the drawings, I have shown in FIGURE 1 a fragmentary view of a vehicle frame, the vehicle having rear wheels 1 and 2, a differential 3 for driving the wheels under motor power by means of a propeller shaft 4. The rear wheels are provided with brakes 5 and 6 which may be of the type shown in FIGURE 9. FIGURE 9 shows the ordinary construction universally used for braking wheels for motor vehicles and in which 7 is the brake drum, 8 and 9 brake shoes within the brake drum with the usual hydraulic cylinder 10 for moving the brake shoes into brake drum engagement. Usually such a brake construction includes cable means 11 as shown at 12 and 13 leading to an emergency brake lever for actuating one or both of the brake shoes to cause a braking operation independently of the hydraulic means shown. The cables 11 in each instance include a cable wire 14 within a protective covering or sheath 15, as is the usual practice in devices of this character. The cable wires 14 are secured to brake selector mechanism which includes two pull rods of identical form. On the instrument panel 17 and at the rear thereof is a short length tubular housing 18 within which is a pull rod 19 to which is attached on the front of the instrument panel a knob 20. The rod carries a wing 21 extending beyond the housing 18, the wing being passed through a longitudinal slot 22 in said housing to prevent the rod from rotating, the rod, however, being rotatable by the knob 20 when the wing reaches a transverse slot 23 communicating with the longitudinal slot 22, and whereby the rod 19 is held in an outward position as indicated by the other of said knobs 20 at 24. The housing 18 is open ended and a sheathed cable wire 30 connects with the end of the rod, the opposite end being passed through a tubular housing 31 and connected to a pin 32. See FIGURE 5. Tubular housing 31 carries an annular end cap 33 through which the cable wire 30 is passed for connection with the pin 32 and between the end cap and pin 32 and within the tubular housing 31, and surrounding the cable wire, is a coil spring 34. Thus when the knob 20 is pulled outwardly to the position shown at 24, the spring is compressed within the housing and upon release of the knob, from the position shown at 24 to that shown at 35, the spring expands and moves the pin to the position shown in FIGURE 5. The brake selector mechanism likewise includes a pair of identically formed slide blocks 40 and 41, and each slide block is received within a housing as shown at 42 and 43. The housings are of identical construction. In the present instance the blocks are of rectangular parallelopiped form and the housings 42 and 43 are of squared section to correspond to a cross section of the slide blocks. The construction as just outlined need not necessarily be followed, the idea being to prevent any rotation of the slide blocks during longitudinal movement within the housings. The housings are in parallel side to side relationship and have the upper ends thereof closed, the lower ends being open, and each housing is provided with a hanger portion 45 and 46. The hanger portions are positioned on opposite sides of a ratchet arm or lever 50 and secured to said ratchet arm 50 by a pin or rivet 51. The fit between the rivet and the hanger portions is such that the housings may swing. Each slide block has a length substantially equal to the length of a housing 42 and 43 and each slide block is provided with a transverse bore 52 which when the block is fully received within its housing, is in alignment with bores 53 and 54 of each housing. The ratchet arm or lever is secured to emergency brake lever 60, as shown at 61. In this particular the ratchet arm 50 is formed to fit the emergency brake lever by providing an enlarged area 62 which is received between the flanged edges 63 and 64 of the brake lever. A head portion 65 of the ratchet arm pivotally carries the housings 42 and 43 as shown in FIGURE 3, the head portion provided with ratchet teeth 66.

A suitable framing or housing 70 is provided for mounting the emergency brake lever and the parts carried thereby; to wit, the ratchet lever, and the housings 42 and 43 with their slide blocks 40 and 41.

The housing or framing 70 includes two side members 71 and 72 open at the top and provided with a base 73 carried by the side 72 and bent for attachment to the side 71. The sides are substantially parallel and bolt 74 extends between said sides and carries the brake lever 60 and associated elements, the housing in turn is mounted upon the fire wall 75 as shown in FIGURE 3.

From the description so far given, when the emergency brake pedal is moved from the position of FIGURE 2 to that of FIGURE 3, the brake lever and the ratchet arm turn on the bolt 74. Normally when the housings 41 and 42 are both in the position of FIGURE 2, the lower ends thereof rest upon the base or shelf 73 and the pins 32 pass through the bores 52 of each slide block as well as the bores 53 and 54 of the housings 42 and 43 to lock the slide blocks within the housings and whereby movement of the brake lever 60 from the position of FIGURE 2 to that of FIGURE 3 will lift both the slide blocks and the housings. The lower ends of the slide blocks are secured to the wires 14 of the cables 11, it being noted from FIGURE 4 that the sheath 15 surrounding the wire 14 terminates and is fastened to the base or shelf 73 with the base or shelf transversely bored for the passage therethrough of the wire 14. A lever 80 at its upper end is swingingly mounted on a bolt 81, which extends transversely between the housing sides 71 and 72, as shown in FIGURES 3 and 4. Swingingly mounted on bolt 83 on opposite sides of ratchet arm 50 are pawls 84 and 85. The pawls are of identical construction and, accordingly, the pawl 84 will be described.

The pawl members 84 and 85 include two substantially right angled lever portions, the outer end of each of the levers terminating in a part which engages a tooth of the ratchet. As is customary construction, two pawl parts are provided which are in overlapped relationship, one pawl adapted to be in advance of the other pawl. Two pawl members are mounted upon a bolt 83 which extends between the side members 71 and 72. Each pawl member has a side extension at the lower end thereof, shown at 89 and 90 and a pair of coil springs 100 and 101 are spacedly carried on bolt 83 with ends 103 and 104 engaging the lateral extensions 89 and 90 while the opposite ends of the coil springs are joined as shown at 102. The lever 80, when rocked, is adapted to release the pawl parts from the ratchet teeth. The lever 80 has at its upper end a bridging piece 110 which straddles the sides 71 and 72 of the housing or framing and held by bolt 51. The lever 80 has an extension 111, and the lever 60 has an extension 112. A coil spring 113 is secured between the extensions. The bridging piece 110 is adapted to engage the lever members shown at 114 and 115 to release the pawl portions 84 and 85 from the ratchet teeth when the lever 80 is rocked in one direction. In this connection, the instrument panel 17 carries a bracket 120 having a sleeve portion 121 through which is passed a rod 122, the rod carrying a knob 123 for moving the rod, the rod also carrying a clevis at 124 for connection through the medium of a pin with the lower end of the lever 80. When the knob 123 is pulled, the rod is moved and the lever is rocked to cause release of the pawls from the ratchet teeth. In addition to the foregoing, visual means is provided for determining which brake is being actuated to brake a wheel. In FIGURE 1 the wheel 2 has been locked against rotation by the brake 6 while the wheel 1 is permitted to rotate under power. Reference is made to FIGURES 6, 7, and 8 which is illustrative of opposite sides of the instrument panel, having electric light bulbs 150 and 151 and showing the knobs 20 positioned beneath the electric light bulbs. As shown in FIGURE 6, the electric light bulbs are each connected to a switch 152 and 153, each switch having a switch arm 154 and a switch contact 155. The switch arm and switch contact are in circuit with the bulbs and with a source of electricity such as the batteries 156. When one of the knobs 20 is pulled outwardly, as shown in FIGURE 2 at 24, and rotated, the wing 21 carried by rod 19 moves the switch arm into engagement with contact 155 to close the circuit and to cause the bulb to illuminate. The knob which has been pulled outwardly, as shown in FIGURES 2 and 8 moves the cable wire 30 and removes the pin 32 from the hole 52 in one of the slide blocks. In the position shown in FIGURES 2, 4 and 8, the extended knob, releases the pin from engagement with the slide block 40 at 40a, while the other slide block 40 at 40b may remain within the confines of the housing 42, being maintained in said position by the pin 32 remaining within the hole 52 of said slide block as shown in FIGURE 5. Both the housing and the slide block are secured together by the pin 32. Hence, when the brake pedal is depressed from the position shown in FIGURE 2 to that of FIGURE 3, the pawl will engage the ratchet teeth to hold both the brake pedal and the ratchet in the position of FIGURE 3 with the brake at 6 for the wheel 2 in locked condition. The wheel 1 is then free to rotate and if wheel 2 is mired down this wheel is prevented from rotating. However, after the vehicle has been moved by wheel 1, the rod 122 may be pulled outwardly by knob 123 which will swing the arm 80 bringing the bridging piece 110 into engagement with the extensions 114 and 115 of the pawl member and, accordingly, lift the pawls 84 and 85 from engagement with the ratchet teeth. When this occurs, the foot pedal will return from the position of FIGURE 3 to that of FIGURE 2 under action of spring 113.

It is to be observed that when the pin 32 is moved within the tubular housing 31 to release the slide block for movement within the slide block housing, the bulb 151 will be lighted to indicate that the wheel 1 is not braked by the brake 5. In other words, the wheel which has traction is indicated by a lighted bulb. If the wheel 2 was not braked and the wheel 1 was braked, then the bulb 150 would be illuminated. This gives the driver warning that after freeing the vehicle from mire, that the extended knob should be pushed inwardly so that the pin connected with the cable may be received within the opening 52 of the slide block 40a.

The operation, uses and advantages of the invention are as follows:

During normal usage of the vehicle and when the vehicle is being driven by both rear wheels 1 and 2, the pins 32 bridge both housings 41 and 42 and are received within the holes 52 of both slide blocks 40. Thus, when the emergency brake lever is moved downwardly, both cables 11 for the wheels 1 and 2, are shown at 12 and 13, are tensioned and the pawls move over the ratchet teeth. The emergency brake may be released by pulling upon the rod 122 to release the pawls from the ratchet teeth. To brake one or the other wheels 1 or 2, the brake selector mechanism is placed in operation by locking the brake for the wheel which has a tendency to spin and not gain traction due to a road condition, such as mud, sand and similar environments. When this occurs the non-spinning wheel is allowed to function while the wheel that spins has its brake locked against wheel movement by moving one of the knobs 20 outwardly to release the pin from engagement with the slide block and housing while the opposite side has the pin in position between a slide block and housing. One of the two lights 150 and 151 will be energized to show which wheel is now turning, which would be wheel 1 when the bulb 151 is illuminated.

I claim:

1. A motor vehicle having two wheels and a differential for driving both wheels, a brake for each wheel and brake selector mechanism for selectively braking one wheel while the other wheel is rotated by the differential, including: a brake lever, a ratchet secured to the brake lever, a pair of housings secured to the ratchet in such position as to vertically rise and lower as the brake lever is moved, a slide block in each housing and means connecting each slide block with a wheel brake, means for selectively locking and unlocking each block to its housing whereby a wheel may be braked independently of the other wheel or both wheels jointly braked when the brake lever is moved from a release position to a braking position, and a pawl for engagement with the ratchet teeth to hold the brake lever in a selected position.

2. The device as set forth in claim 1, characterized in that: means are provided for releasing the pawl from ratchet tooth engagement to release the brakes for each wheel and return the brake lever to release position.

3. The device as set forth in claim 1, characterized in that: each housing and slide block is provided with a transverse bore, the bores of which are adapted to axially align when the slide block is fully received within the housing, and the means for locking and unlocking each block to its housing comprising a pin adapted to be received in the aligned holes of said slide block and housing to maintain the same in locked position.

4. The device as set forth in claim 3, characterized in that: the means connecting each slide block with a wheel brake includes a cable and said means for locking and unlocking each block to its housing includes means for biasing said pin toward reception within the axially alinged holes of the slide block and the housing.

5. The device of claim 1, characterized in that: visual means is provided to indicate which wheel is unbraked.

References Cited
UNITED STATES PATENTS

| | | | |
|---|---|---|---|
| 1,782,176 | 11/1930 | Piché | 188—16 |
| 2,556,287 | 6/1951 | Milster | 188—16 X |

BENJAMIN HERSH, *Primary Examiner.*

J. A. PEKAR, *Assistant Examiner.*